(12) United States Patent
Sergunin

(10) Patent No.: US 9,712,627 B2
(45) Date of Patent: Jul. 18, 2017

(54) USER INTERFACE PROVISIONING SYSTEM

(71) Applicant: EBAY INC., San Jose, CA (US)

(72) Inventor: Sergii Sergunin, San Jose, CA (US)

(73) Assignee: EBAY INC., San Jose, CA (US)

(*) Notice: Subject to any disclaimer, the term of this patent is extended or adjusted under 35 U.S.C. 154(b) by 228 days.

(21) Appl. No.: 13/955,610

(22) Filed: Jul. 31, 2013

(65) Prior Publication Data

US 2015/0040026 A1 Feb. 5, 2015

(51) Int. Cl.
*G06F 3/00* (2006.01)
*H04L 29/08* (2006.01)
*G06F 3/0481* (2013.01)
*G06F 9/44* (2006.01)

(52) U.S. Cl.
CPC ............ *H04L 67/22* (2013.01); *G06F 3/0481* (2013.01); *G06F 9/4443* (2013.01); *H04L 67/02* (2013.01); *H04L 67/306* (2013.01)

(58) Field of Classification Search
CPC ........ G06F 9/4443; G06F 3/0481; G06F 8/38; G06F 1/163; G06F 3/011; G06Q 30/02
USPC .................................................. 715/745, 744
See application file for complete search history.

(56) References Cited

U.S. PATENT DOCUMENTS

| | | | |
|---|---|---|---|
| 8,015,494 B1* | 9/2011 | Hull ...................... | G06F 9/4443 715/745 |
| 2007/0061243 A1* | 3/2007 | Ramer et al. ................... | 705/37 |
| 2007/0073718 A1* | 3/2007 | Ramer .................. | G06F 3/0338 |
| 2008/0144943 A1* | 6/2008 | Gokturk .............. | G06F 17/3025 382/224 |
| 2011/0078628 A1* | 3/2011 | Rosenberg ............. | G06Q 30/02 715/811 |
| 2013/0073473 A1* | 3/2013 | Heath ........................... | 705/319 |
| 2013/0117105 A1* | 5/2013 | Dyor et al. ................ | 705/14.52 |
| 2013/0212487 A1* | 8/2013 | Cote ........................ | G06F 3/048 715/745 |
| 2013/0246904 A1* | 9/2013 | Seliger .................. | G06F 3/0481 715/234 |

* cited by examiner

*Primary Examiner* — Joy Weber

(57) ABSTRACT

Systems and methods for providing a user interface include collecting user activity data that includes navigation details provided from each of a plurality of user devices in navigating through a user interface. User interface use profiles are determined using the user activity data and include information on the likelihood of at least one subsequent navigation detail based on at least one present navigation detail. A new user navigation detail is received from a new user device accessing the user interface, and a first user interface use profile is retrieved based on a first present navigation detail in the first user interface use profile that corresponds to the new user navigation detail. A customized user interface is then created using a first subsequent navigation detail associated the first present navigation detail in the first user interface use profile, and that customized user interface is provided to the new user device.

20 Claims, 12 Drawing Sheets

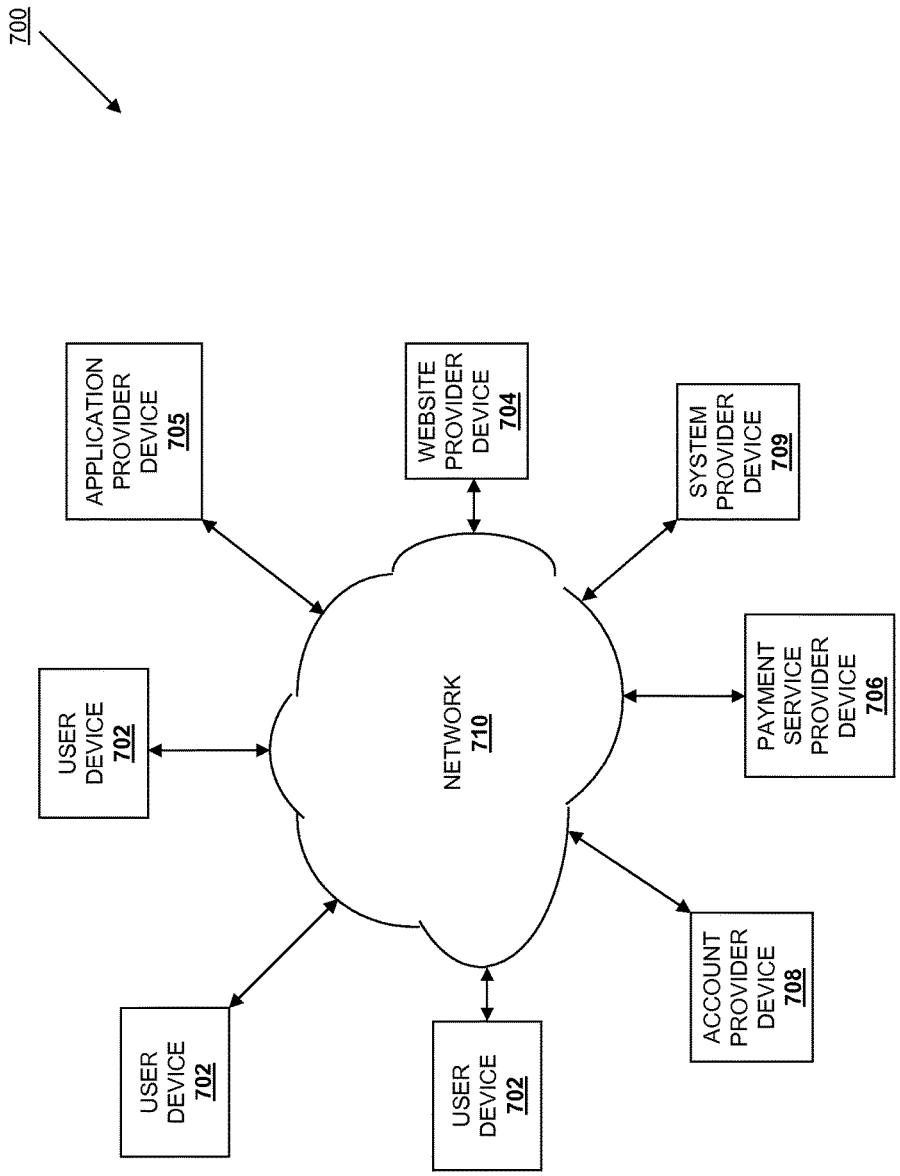

USER INTERFACE PROVISIONING SYSTEM

BACKGROUND

Field of the Invention

The present invention generally relates to online and/or mobile payments and more particularly to a user interface provisioning system that allows user workflows through user interfaces such as, for example, online and/or mobile payment websites and applications, to be predicted and the user interface to be customized.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

In some systems, including online and/or mobile payment systems, it is desirable to customize websites, applications, and/or other user interfaces in order to optimize the experience of the user with the user interface. Conventionally, such customization and optimization is accomplished by providing the user with customization capabilities that allow the user to inform the system provider what features of the application, website, and/or user interface are most important to them, which features need not be presented, and/or a variety of other customization information known in the art. However, such conventional customization and optimization systems rely on information provided by each user in order to customize the user interface for that user, and thus those customization and optimization systems are user specific, and provide no ability to customize or optimize user interface for new users or users that are otherwise unknown to the system.

Thus, there is a need for an improved user provisioning system.

BRIEF DESCRIPTION OF THE FIGURES

FIG. 7 is a schematic view illustrating an embodiment of a networked system;

Figure 1:
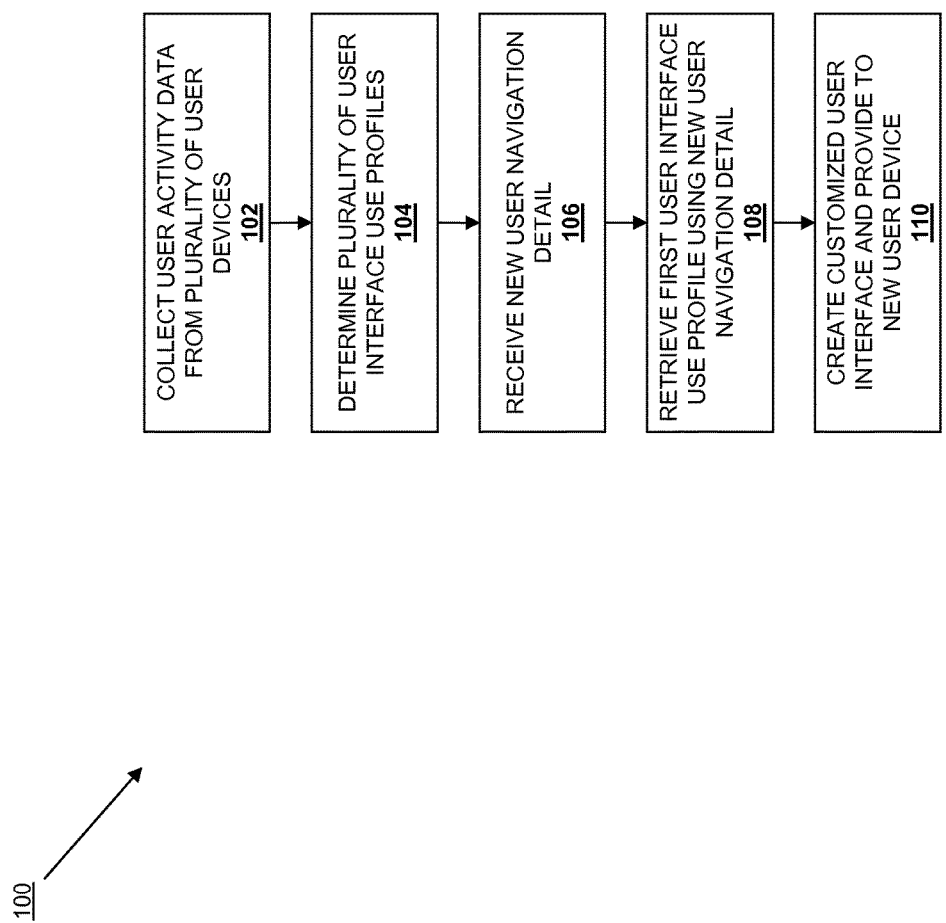
FIG. 1 is a flow chart illustrating an embodiment of a method for providing a user interface.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure provide systems and methods for customized a user interface by predicting a subsequent navigation detail based on a present navigation detail received from a user device that is accessing the user interface. The systems and methods collect user activity data from a plurality of user devices as those user devices navigate into, through, and out of a user interface and store the user activity data as a plurality of sets of navigation details that describe how each user device navigated, moved through, or otherwise interacted with the user interface. That user activity data may then be analyzed to determine a plurality of user interface use profiles that may be grouped or otherwise used to determine the likelihood of one or more subsequent navigation details based on any particular present navigation detail provided by a user device accessing the user interface.

For example, some users may navigate into a website user interface via an entry web page that is a home web page, and that information may be interpreted as a present navigation detail. Following navigation into the website user interface via the home web page, a majority of those users may provide a subsequent navigation detail that includes the use of a search feature on the website user interface immediately following being presented with the home web page. In such examples, a user interface use profile may be determined from such information that will indicate that any user that enters the website user interface through the home web page is likely to immediately perform a search using the search feature on the website user interface.

In another example, some users may navigate into a website user interface via an entry web page that is a product web page, and that information may be interpreted as a present navigation detail. Following navigation into the website user interface via the product web page, a majority of those users may provide a subsequent navigation detail that includes the selection of a product details feature on the website user interface immediately following being presented with the product web page. In such examples, a user interface use profile may be determined from such information that will indicate that any user that enters the website user interface through the product web page is likely to immediately attempt to view product details using the product details feature on the website user interface.

Following the determination of one or more user interface use profiles, the systems and methods may then receive a new user navigation detail from a user accessing the user interface, and that new user navigation detail may be used to retrieve at least one of the user interface use profiles. That retrieved user interface use profile may then be used to customize the user interface provided to the user currently accessing the user interface. Using the first of the examples above, if the new user navigation detail indicates that that user navigated into the website user interface via the home web page, the retrieved user interface use profile may be used to customize the home web page on the website user interface to include an enlarged search feature (as the most likely subsequent navigation detail includes the performance of a search using the search feature on the website user interface), and in some embodiments, a user instruction may be provided that informs the user that they should use the search feature to search for a desired product. Using the second of the examples above, if the new user navigation detail indicates that that user navigated into the website user interface via the product web page, the retrieved user interface use profile may be used to customize the product web page on the website user interface to automatically include the product details feature (as the most likely subsequent navigation detail includes will be an attempt to view product details using the product details feature on the website user interface), and in some embodiments, a user instruction may be provided that informs the user that they may quickly browse through the product details provided to find out more about the product.

The systems and methods may then provide the customized user interface to the user currently accessing the user interface. A retrieved user interface use profile may be used to customize a user interface based on any present navigation detail provided by a user, and other user interface use profiles may be retrieved and used for the user interface customization if, for example, a user provides a present navigation detail that a currently retrieved user interface use profile did not predict, or if other user interface use profiles predict a higher likelihood of a different subsequent navigation detail. As such, a user navigating through a user interface may have that user interface continually customized as the user navigates through the user interface, and that customization will be based on the navigation details of a plurality of other users that previously navigated through the user interface. In this manner, even users that are unknown to the system may be presented a customized user interface, as the likelihood of any subsequent navigation detail may be predicted based on a present navigation detail provided by that user and any of a plurality of user interface use profiles determined based on the previous navigations of the user interface by a plurality of other users.

Figure 2:
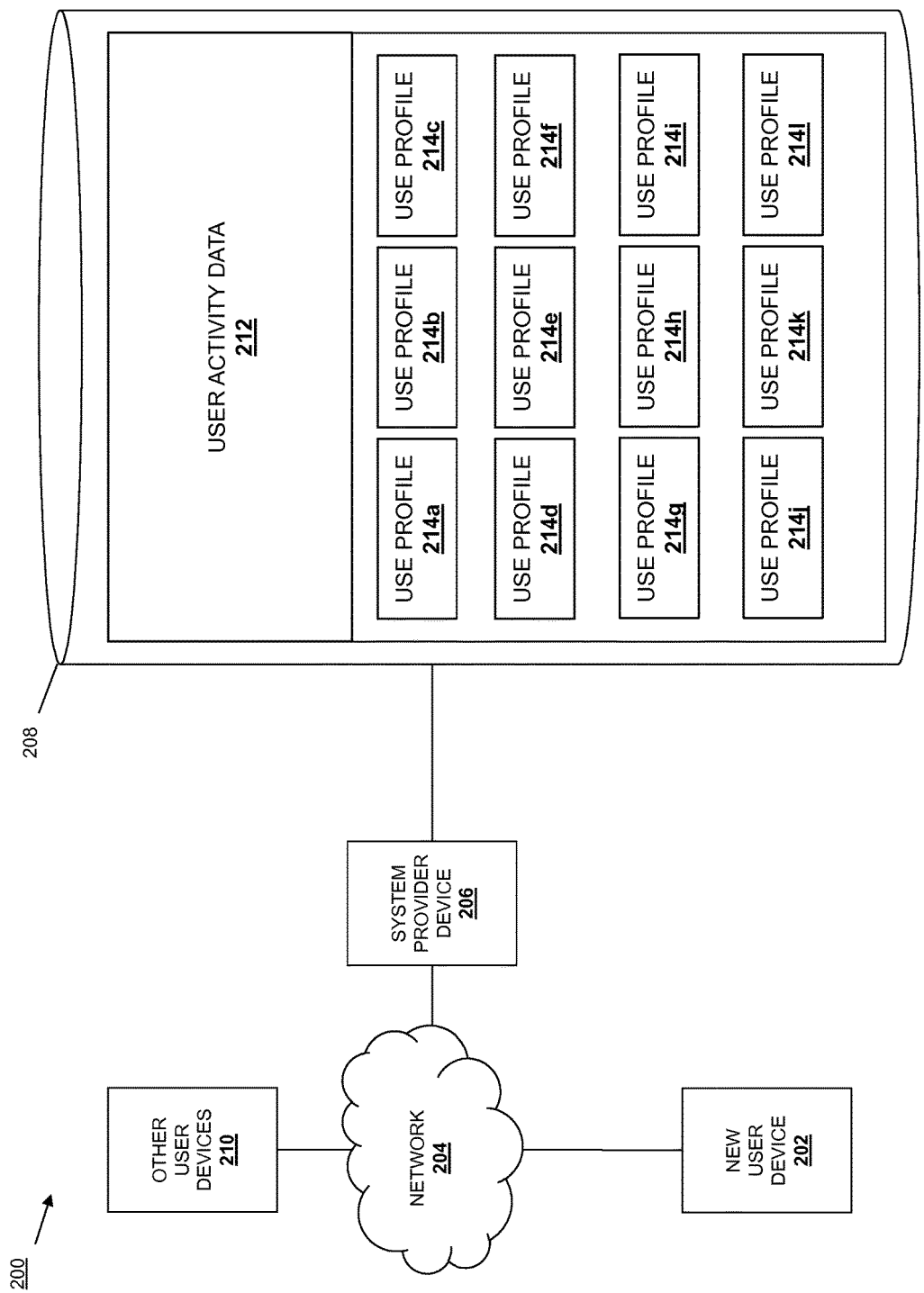
FIG. 2 is a schematic view illustrating an embodiment of a user interface provisioning system.

Referring now to FIGS. 1 and 2, an embodiment of a method 100 for providing a user interface is illustrated. In the embodiments illustrated and discussed below, the user interface is a website user interface that allows users to search for and view products for sale, make bids and/or online purchases of those products, and/or perform a variety of other website user interface actions known in the art. However, user interfaces customized according to the systems and methods discussed herein may include applications (e.g., provided over a network, local to a user device, etc.) and/or any other user interface known in the art.

The method 100 begins at block 102 where user activity data is collected from a plurality of user devices. Referring now to FIG. 2, an embodiment of a user interface provisioning system 200 is illustrated. A new user in the user interface provisioning system 200 may include a new user device 202 that is connected to a network 204 such as, for example, the Internet. A system provider device 206 is connected to the network 204 as well as to a database 208. While the system provider device 206 is illustrated as directly connected to the database 208, the system provider device 206 may be connected to the database 208 through the network 204 while remaining within the scope of the present disclosure. A plurality of other user devices 210 are coupled to the network 204 as well. While the plurality of other user devices 210 are illustrated as currently coupled to the network 204 along with the new user device 202, one of skill in the art in possession of the present disclosure will recognize that the other user devices 210 may not be currently connected to network 204 at the same time as the new user device 202, as the user activity data that is retrieved from the other user devices 210 as discussed below may be retrieved when the new user device 202 is not connected to the network 204.

Furthermore, while the terms "new" user device and "other" user device are used in the embodiments discussed herein, any user devices may provide the user activity data that is discussed below as being used to customize a user interface for another user device that is currently accessing a user interface. As such, while in some embodiments the new user device 202 belongs to a user that was previously unknown to the user interface provisioning system 200, in other embodiments the new user device 202 may be a user device belonging to a user that was previously known to the user interface provision system 200. As such, the user interface provisioning system 200 may be used to customize a user interface for provisioning to any user device. For example, the user interface provisioning system 200 may customize a user interface for provisioning to a user device (i.e., the new user device 202) any time that user device accesses the user interface, even if that user device has previously accessed the user interface.

In the embodiments discussed and illustrated below, the system provider device 206 is a website provider device that operates the user interface provisioning system 200 to provide customized website user interfaces to user devices. However, as discussed above, the system provider device 206 may be an application provider device that operates the user interface provisioning system 200 to provide customized application user interfaces to user devices. Furthermore, the system provider device 206 may be operated by any entity such as, for example, a third party entity that operates to customize website user interfaces or application user interfaces provided by another entity. As such, the system provider device 206 may be operated by a variety of different entities to provide customized user interfaces as discussed below while remaining within the scope of the present disclosure.

Referring now to FIGS. 1, 2, 3, and 4, in an embodiment of block 102, the system provider device 206 collects user activity data from the plurality of other user devices 210. For example, at any time, each of the other user devices 210 may access and navigate through a user interface that is provided and/or monitored by the system provider device 206.

Figure 3:
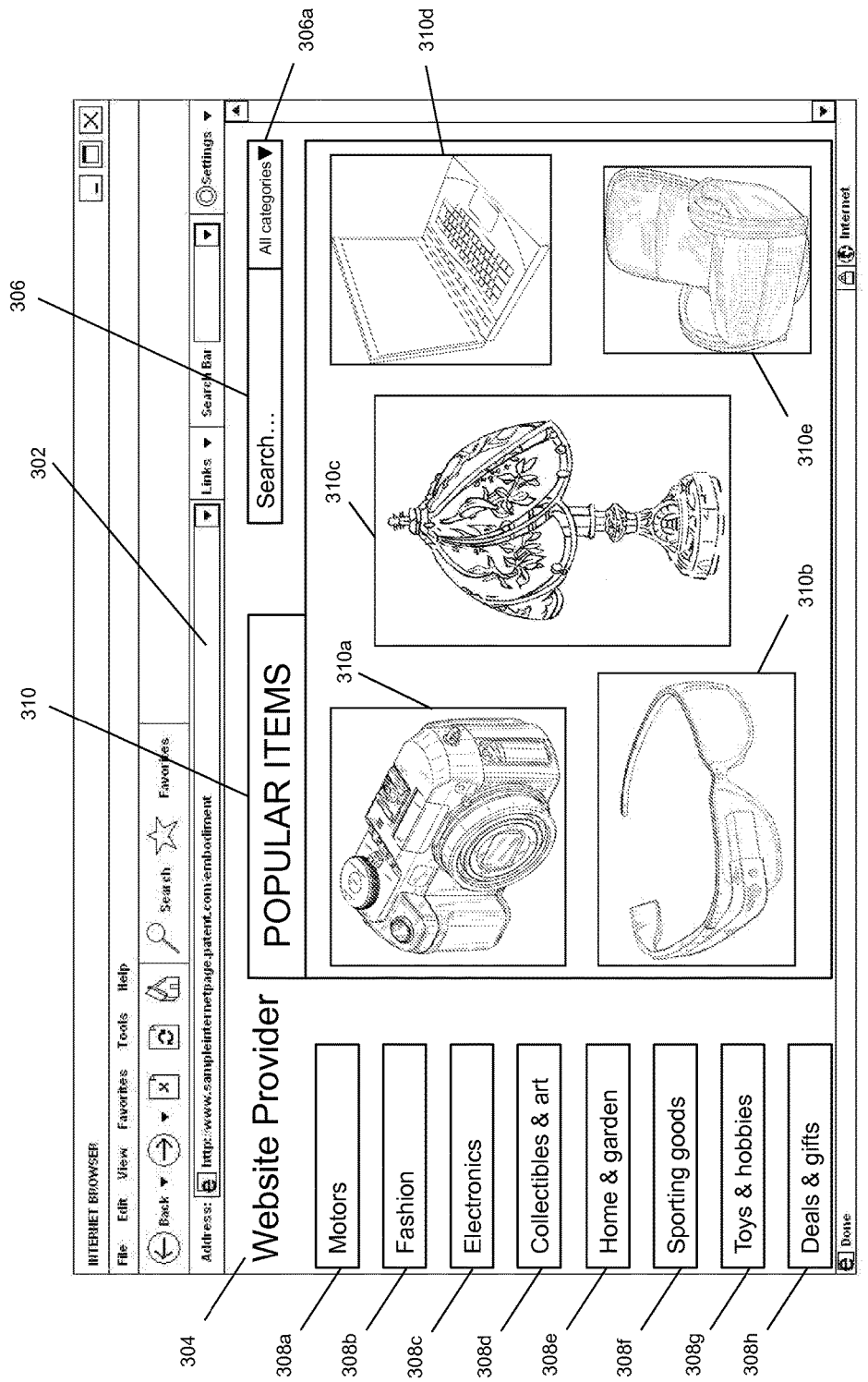
FIG. 3 is a screen shot illustrating an embodiment of a non-customized home page of a website or application.

FIG. 3 illustrates a non-customized home page 300 of a website user interface that may be provided and/or monitored by the system provider device 206. For example, the non-customized home page 300 may be an "entry page" provided by the system provider device 206 to any of the other user devices 210 over the network 204 in response to associated users providing an appropriate website address for the website in a website address input 302 (e.g., www-.websiteprovider.com) on an Internet Browser. Thus, in some embodiments, "entry page" may refer to the first web page of the website user interface that is provided to the other user devices 210 prior to the user navigating to other web pages of the website (i.e., the user may be on a web page provided by a second website provider, the user may then type the website address of a website provided by a first website provider, and then the non-customized home page 300 will be provided as an entry page to the user by the first website provider.) The provision of the non-customized home page 300 as an entry page to each of the other user devices 210 following the provision on those other user devices 210 of the website address for the website user interface in the website address input 302 may be referred to as a navigation detail provided by each other user device 210 as user activity data. As described in further detail below, user activity data collected from each of the other user devices 210 may include a plurality of navigation details, and the customization of a user interface for the new user device 202 currently accessing the user interface may include categorizing those navigation details as "prior" navigation details, "present" navigation detail, and "subsequent" navigation details, depending on how the new user device 202 is accessing a particular web page of the website user interface.

The non-customized home page 300 illustrated in FIG. 3 includes a website provider identifier 304 identifying a website provider; a search input 306 along with a search input category filter 306a for allowing users to search for products that are viewable on the website user interface; a plurality of product category links 308a, 308b, 308c, 308d, 308e, 308f, 308g, and 308h; and a popular items display 310 including a plurality of item images 310a, 310b, 310c, 310d, and 310e. While the example of the non-customized home page 300 provided in FIG. 3 include features specific to a product bidding and purchasing website, one of skill in the art in possession of the present disclosure will recognize that the non-customized home page may include any features for any type of website user interface while remaining within the scope of the present disclosure. In an embodiment, the non-customized home page 300 may be created by a website provider and provided to other user devices 210 until enough user activity on that non-customized home page 300 has been collected such that the non-customized home page 300 may be customized according to the systems and methods described herein. For example, a predetermined number of other user devices 210 may be required to provide user activity data, discussed below, that is related to the non-customized home page 300 before the method 100 may proceed to block 104. As such, the non-customized home page 300 may be provided to other user devices 210 that provide the website address for the website in the website address input 302 until enough user activity data has been collected from those other user devices to allow the prediction of subsequent navigation details such that a customization of the non-customized home page 300 may be provided, discussed below, to any new user devices that provide the website address for the website in a website address input on their Internet browser.

In an embodiment, user activity data provided for the non-customized home page 300 may include any instruction received from the other user devices 210 that resulted in the provision of the non-customized home page 300 to those other user devices 210, instructions received from the other user devices 210 following the provision of the non-customized home page 300 to provide any number of other web pages associated with the website user interface that includes the non-customized home page 300, timing data that details how much time has passed between the provision by the other user devices 210 of instructions associated with the website user interface, and/or a variety of other navigation details known in the art.

As discussed above, a first example of a navigation detail associated with user activity data provided by other user devices 210 includes the provision of the website address for the website in the website address input 302 (e.g., www-.website provider.com) that resulted in the provision of the non-customized home page 300 to the other user devices 210 (e.g., a "present navigation detail" for the purposes of this specific example of "subsequent navigation details"). A specific example of a subsequent navigation detail provided by other user devices 210 and included in user activity data provided by those other user devices 210 includes an instruction from the other user devices 210 to conduct a search, which may be received in response to those other user devices 210 providing one or more search terms in the search input 306. Another specific example of a subsequent navigation detail provided by other user devices 210 and included in user activity data provided by those other user devices 210 includes an instruction from the other user devices 210 to open a product category page, which may be received in response to those other user devices 210 selecting one of the product category links 308a-308b. Yet another specific example of a subsequent navigation detail provided by other user devices 210 and included in user activity data provided by those other user devices 210 includes timing data and an instruction from the other user devices 210 to provide details about a specific product, which may be received in response to those other user devices 210 selecting one of the items images 310a-310e. In such an example, timing data may include data indicating an amount of time it took to receive the instruction to provide details about the specific product (e.g., following the completion of the loading of the non-customized home page 300 on the other user device 210, following the display of the item image that was selected, etc.)

Figure 4:
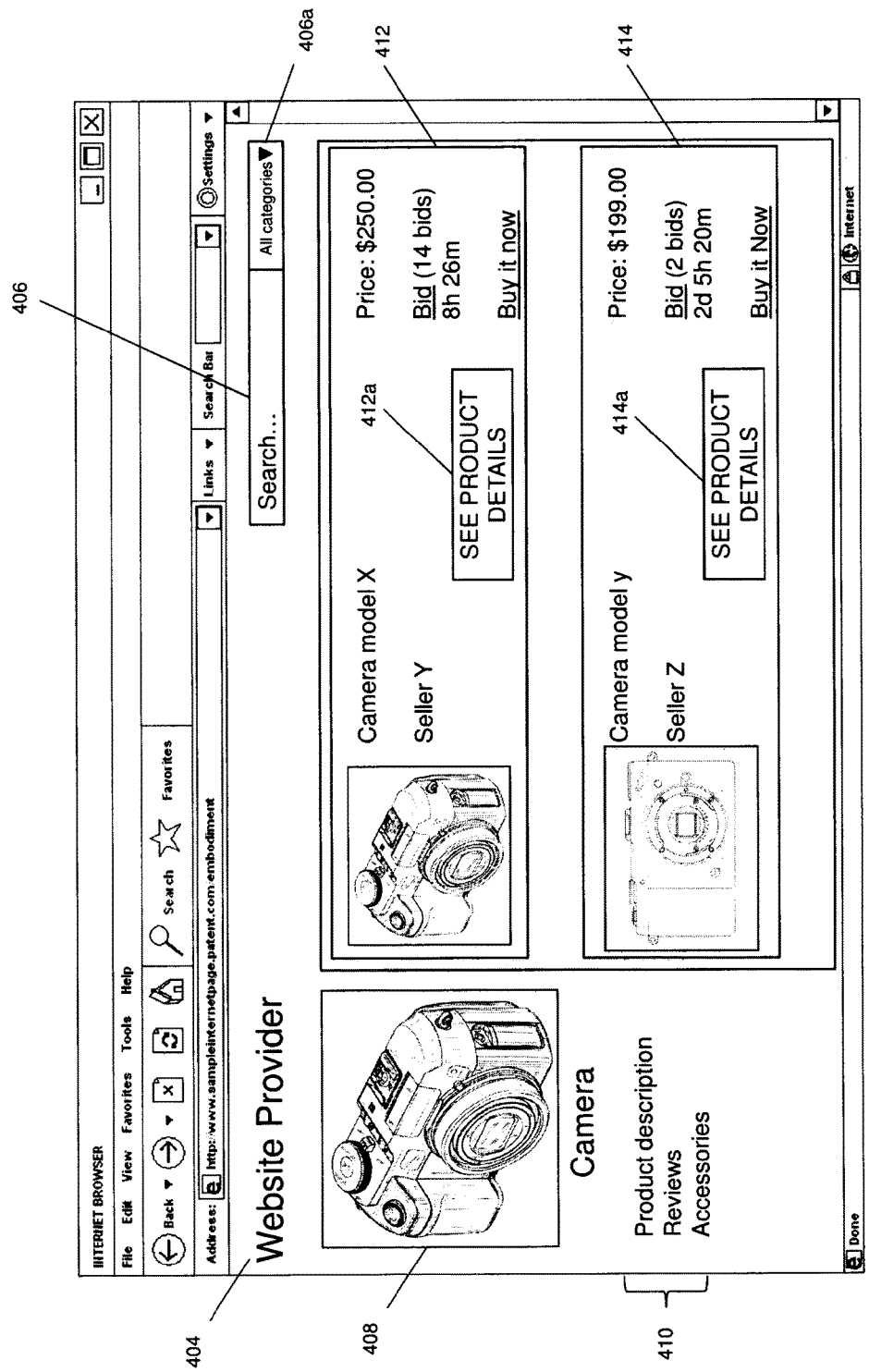
FIG. 4 is a screen shot illustrating an embodiment of a non-customized product page of a website or application.

FIG. 4 illustrates a non-customized product page 400 of a website that may be provided and/or monitored by the system provider device 206. For example, the non-customized product page 400 may be an "entry page" provided by the system provider device 206 over the network 204 to any of the other user devices 210 in response to associated users providing an appropriate search query for a product in a search input (e.g., the search input 402 illustrated on an Internet Browser in FIG. 4, a search website, etc.) and then selecting a web link provided on a search results page. Thus, as discussed above, "entry page" may refer to the first web page of the website user interface that is provided by the website provider to the user prior to the user navigating to other web pages of the website (i.e., the user may be on a web page provided by a second website provider, the user may then type the search query for a product, the user may then receive a search results page provided by the search provider that includes a web link to the non-customized product page 400, and then the non-customized product page 400 will be provided as an entry page to the user by a first website provider in response to the user selecting that web link.) The provision of the non-customized product page 400 as an entry page to each of the other user devices 210 following the provision on those other user devices 210 of the search query for the product and the selection of a web link provided on a search results page may be referred to as a navigation detail provided by each other user device 210 over the network 204 to the system provider device 206 as user activity data.

The non-customized product page 400 illustrated in FIG. 4 includes a website provider identifier 404 identifying a website provider; a search input 406 along with a search input category filter 406a for allowing users to search for products described by the website; a product image 408 of a product type that matched the search query provided by the user; product information 410 including a description, reviews, and accessories related to the product type that matched the search query provided by the user; a first product section 412 for a first product being offered on the website that matches the search query provided by the user; and a second product section 414 for a second product being offered on the website that matches the search query provided by the user. The first product section 412 includes an image of a product for sale, a product name, a seller name, a price, a bid instruction, a buy instruction, and a product details link 412a that may be selected by a user to be provided details about the product. The second product section 414 includes an image of a product for sale, a product name, a seller name, a price, a bid instruction, a buy instruction, and a product details link 414a that may be selected by a user to be provided details about the product.

While the example of the non-customized product page 400 provided in FIG. 4 include features specific to a product bidding and purchasing website, one of skill in the art in possession of the present disclosure will recognize that the non-customized product page may include any features for any type of website user interface while remaining within the scope of the present disclosure. The non-customized product page 400 may be created by a website provider and provided to other user devices 210 until enough user activity on that non-customized product page 400 has been collected such that the non-customized product page 400 may be customized according to the systems and methods described herein. For example, a predetermined number of other user devices 210 may be required to provide user activity data, discussed below, that is related to the non-customized product page 400 before the method 100 may proceed to block 104. As such, the non-customized product page 400 may be provided to other user devices 210 that provide a search query for the product and select the web link on a search result page until enough user activity data has been collected from those other user devices to allow the prediction of subsequent navigation details that allow for the customization of the non-customized product page 400, discussed below, for any new user devices that provide the search query for the product and select the web link on a search result page.

In an embodiment, user activity data provided for the non-customized product page 400 may include any instruction received from the other user devices 210 to provide the non-customized product page 400, instructions received by the other user devices 210 following the provision of the non-customized product page 400 to provide any number of other web pages associated with the website user interface that includes the non-customized product page 400, timing data that details how much time has passed between the provision by the other user devices 210 of instructions associated with the website user interface, and/or a variety of other navigation details known in the art.

As discussed above, a first example of a navigation detail associated with user activity data provided by other user devices 210 includes the provision of the search query for the product and selection of the web link on a search result page that causes the non-customized product page 400 to be provided (e.g., a "present navigation detail" for the purposes of this specific example of "subsequent navigation details".)

In one specific example of a subsequent navigation detail provided by other user devices 210 and included in user activity data provided by those other user devices 210 includes an instruction from the other user devices 210 to provide details about a product in the first product section 412 that is received in repose to those other user devices 210 selecting the product details link 412a. Another specific example of a subsequent navigation detail provided by other user devices 210 and included in user activity data provided by those other user devices 210 includes an instruction from the other user devices 210 to allow a bid to be provided for the product in the first product section 412 that is received in response to those other user devices 210 selecting the bid instruction in the first product section 412. Yet another specific example of a subsequent navigation detail provided by other user devices 210 and included in user activity data provided by those other user devices 210 includes timing data and an instruction from the other user devices 210 to provide details about a product in the second product section 414 that is received in response to those other user devices 210 selecting the product details link 414a. In such an example, timing data may include data indicating an amount of time it took the other user devices 210 to select the product details link 414a (e.g., following the completion of the loading of the non-customized product page 400 on the other user device 210, following the display of the second product section 414, etc.)

Referring back to FIG. 2, the system provider device 206 may store the user activity data 212 collected at block 102 in the database 208, and as discussed above, that user activity data may include sets of navigation details provided by the other user devices 210 in navigating through the user interface. While the embodiments provided in FIGS. 3 and 4 above include examples where the other user devices 210 provide a first navigation detail that results in an entry page being provided to those other user devices 210, followed by the other user devices 210 providing a second navigation detail that includes an action provided on that entry page, the present disclosure is not limited to only those examples. In fact, each subsequent action taken on pages of a website or application provided to other user devices 210 may be part of the set navigation details provided as user activity data by other user devices such that user workflows through the user interface are collected. Thus, a set of navigation details in user activity data provided by a user device may include user device being provided an entry page on a website, conducting a search using a search function, selecting product details for a product returned according to that search, providing a bid instruction, etc. Furthermore, separate user activity data may be collected each time a user device accesses a web page on the web site. Thus, the same user device may access a website a variety of different times and in a different manners (e.g., a first time according to the entry page discussed above with reference to FIG. 3, and a second time according to the entry page discussed above with reference to FIG. 4) and a plurality of separate user workflows may be generated as user activity data and stored as the user activity data 212 in the database 208.

In other examples, user devices may provide first navigation details that include the selection of particular links on a web page (e.g., a link for a particular product), followed by second/subsequent navigation details that include the selection of other links (e.g., a description of the particular product). Furthermore, in another example, user devices may provide a first navigation detail for an application user interface that includes a startup of the application at a particular time (e.g., early in the morning), followed by a second/subsequent navigation detail of the selection of a link to particular information (e.g., weather for a particular location). Thus, one of skill in the art will recognize the wide variety of information that may be provided in the sets of navigation details that are provided by the other user devices 210 over the network 204 to the system provider device 206.

The method 100 then proceeds to block 104 where a plurality of user interface use profiles are determined. As discussed above, the user activity data may include a plurality of user workflows that are received from the other user devices 210 when those other user devices 210 navigate into, through, and out of the user interface provided and/or monitored by the system provider device 206. In an embodiment, when a predetermined number of user workflows associated with the website user interface and/or one or more web pages on the website user interface have been collected as the user activity data 212, the system provider device 206 may analyze that user activity data 212 to determine a plurality of user interface use profiles 214a, 214b, 214c, 214d, 214e, 214f, 214g, 214h, 214i, 214j, 214k, and 214l.

In an embodiment, a user interface use profile includes information on the likelihood of at least one second/subsequent navigation detail based on at least one first/currently provided navigation detail. For example, any particular user interface use profile may include a first navigation detail that is associated with one or more second navigation details, and each of those second navigation details may be associated with one or more third navigation details, as so on. Using the example of the non-customized home page 300 discussed above with reference to FIG. 3, a user interface use profile determined from user activity associated with that non-customized home page 300 may include a first navigation detail that includes the provision of the non-customized home page 300 following the provision of a website address for the website user interface in a website address input, and a primary second navigation detail associated with the first navigation detail may include the provision of one or more search terms in a search input based on other user devices 210 performing the primary second navigation detail 65% of the time after providing the first navigation detail. In addition, a secondary second navigation detail associated with the first navigation detail may include an instruction from the other user devices 210 to open a product category page based on other user devices 210 performing the secondary second navigation detail 30% of the time after providing the first navigation detail. In addition, each of the primary and secondary second navigation details may be associated with third navigation details that detail a third action typically performed after performing the first navigation detail and one of the primary second navigation detail or the secondary second navigation detail.

Using the example of the non-customized product page 400 discussed above with reference to FIG. 4, a user interface use profile determined from user activity associated with that non-customized product page 400 may include a first navigation detail that includes the provision of the non-customized product page 400 following the provision of the search query for the product and selection the web link on a search results page, and a primary second navigation detail associated with the first navigation detail may include the provision of an instruction from the other user devices 210 to provide details about a product in the first product section 412 based on other user devices 210 performing the primary second navigation detail 40% of the time after providing the first navigation detail. In addition, a secondary second navigation detail associated with the first navigation detail may include timing data and an instruction from the other user devices 210 indicating that users typically spend a predetermined amount of time before providing an instruction to provide details about a product in the second product section 414 based on other user devices 210 performing the secondary second navigation detail 25% of the time after providing the first navigation detail. In addition, each of the primary and secondary second navigation details may be associated with third navigation details that detail a third action typically performed after performing the first navigation details and one of the primary second navigation detail or the secondary second navigation detail.

In yet another example, a user interface use profile determined from user activity associated with an application user interface may include a first navigation detail that includes the startup of the application user interface at a particular time (e.g., in the morning), and a primary second navigation detail associated with the first navigation detail may include the provision of a particular instruction from the other user devices 210 (e.g., weather in a particular location) based on other user devices 210 performing the primary second navigation detail 55% of the time after providing the first navigation detail. In addition, a secondary second navigation detail associated with the first navigation detail may include another particular instruction from the other user devices 210 to provide a satellite weather map based on other user devices 210 performing the secondary second navigation detail 15% of the time after providing the first navigation detail. In addition, each of the primary and secondary second navigation details may be associated with third navigation details that detail a third action typically performed after performing the first navigation details and one of the primary second navigation detail or the secondary second navigation detail.

Thus, each user interface use profile includes a plurality of navigation details that detail common user workflows performed by users in using the user interface. Those user workflows may include any number of navigation details or steps, and those navigation details may be included in the user interface use profile in response to having been performed some minimum percentage of the time following their associated previous navigation detail having been performed. Thus, some user interface use profiles may include only two associated navigation details, while other user interface use profiles may include several layers of associated navigation details. In some embodiments, different user interface use profiles (e.g., any or all of the user interface user profiles 214a-l) may be linked, cross referenced, or otherwise associated in the database 208. For example, any plurality of user interface use profiles may include a common web page or application page, and those plurality of user interface use profiles may be associated through that common web page or application page such that once the new user device 202 provides a new user navigation detail, discussed below, that results in the provision of that common web page or application page, one or more of those user interface use profiles may be used to determine the appropriate customization for the user interface for that new user device.

Referring back to FIGS. 1 and 2, the method 100 then proceeds to block 106 where a new user navigation detail is received. In an embodiment, the new user device 202 may access the user interface provided and/or monitored by the system provider device 206 over the network 204 and, in response, provide a new user navigation detail over the network 204 to the system provider device 206. For example, at block 106, the new user device 202 may access an entry page for a website user interface provided and/or monitored by the system provider device 206, launch an application provided and/or monitored by the system provider device 206 (e.g., at a particular time), and/or otherwise perform an action associated with a user interface that may be detected by the system provider device 206.

The method 100 then proceeds to block 108 where a first user interface use profile is retrieved using the new user navigation detail. In an embodiment, at block 108, the system provider device 206 uses the new user navigation detail received at block 106 to retrieve one of the user interface use profiles 214*a-l* from the database 208. For example, if the new user navigation detail includes that the new user device 202 is attempting to access a home page of the website user interface following the provision of a website address for the website user interface in a website address input, the user interface use profile retrieved from the database 208 may be a user interface user profile that includes a first navigation detail of attempting to access a home page of the website user interface following the provision of a website address for the website user interface in a website address input. Similarly, if the new user navigation detail includes that the new user device 202 is attempting to access a product page of the website user interface following the provision of the search query for a product and selection the web link on a search result page, the user interface use profile retrieved from the database 208 may be the user interface use profile that includes a first navigation detail of attempting to access a product page of the website user interface following the provision of the search query for a product and selection the web link on a search result page. Similarly, if the new user navigation detail includes that the new user device 202 launching an application user interface at a particular time, the user interface use profile retrieved from the database 208 may be the user interface use profile that includes a first navigation detail of launching the application user interface at that particular time.

The method 100 then proceeds to block 110 where a customized user interface is created and provided to the new user device. In an embodiment, using the user interface use profile retrieved at block 108, the system provider device 206 may customize the user interface. The user interface use profile was retrieved at block 108 based on a first navigation detail included in that user interface use profile corresponding to the new user navigation detail, and the primary second navigation detail associated with that first navigation detail in the user interface use profile may then be used to modify a non-customized user interface to provide a customized user interface. As discussed above, the primary secondary navigation detail indicates the most likely subsequent user navigation detail that will be received from the new user device 202 following the provision of the new user navigation detail, and thus may be used to customize the user interface to make that performance of that most likely subsequent user navigation detail easier for the new user device 202.

Figure 5A:
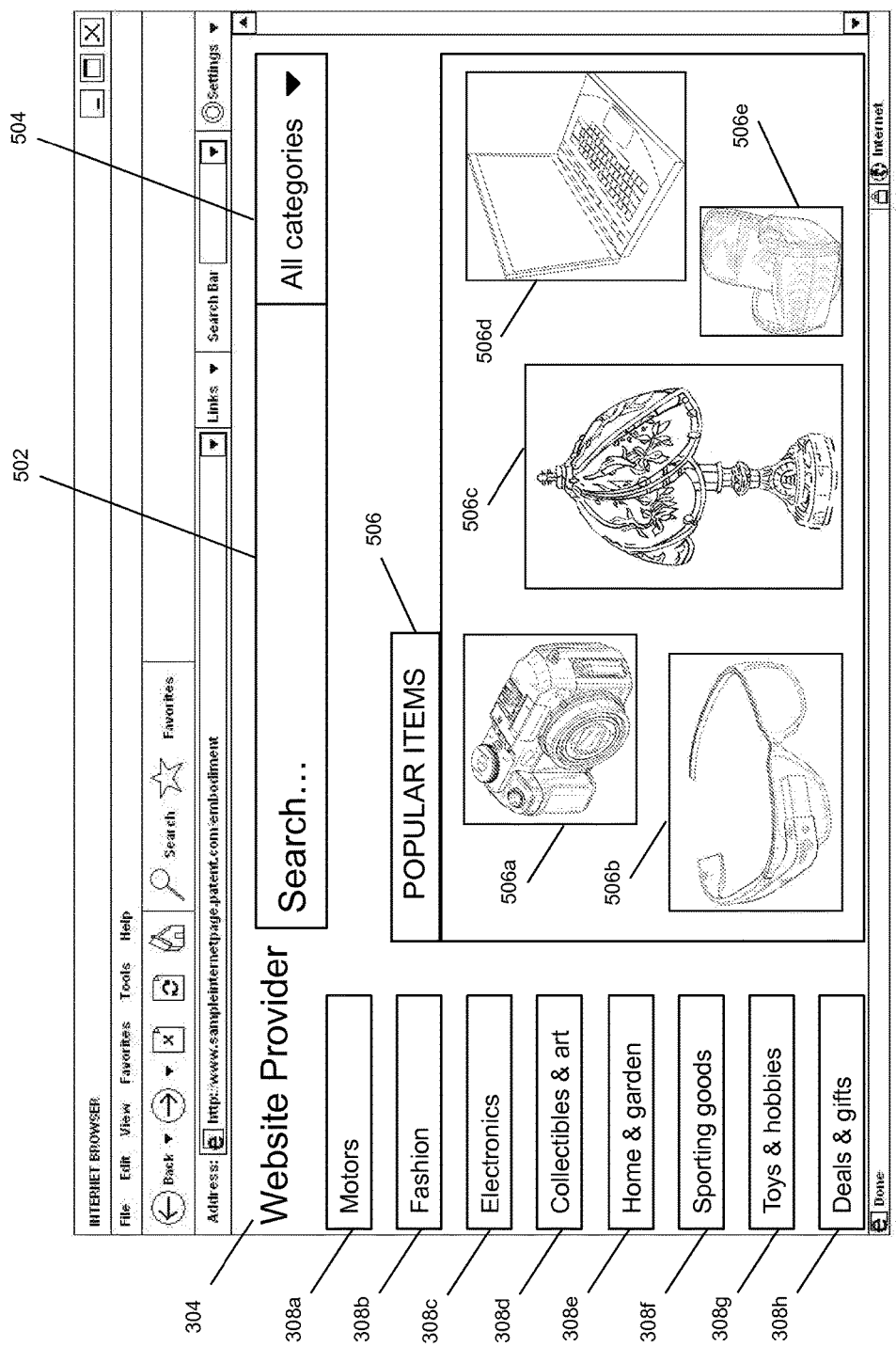
FIG. 5a is a screen shot illustrating an embodiment of the customization of the non-customized home page of FIG. 3 to provide a customized home page.
Figure 5B:
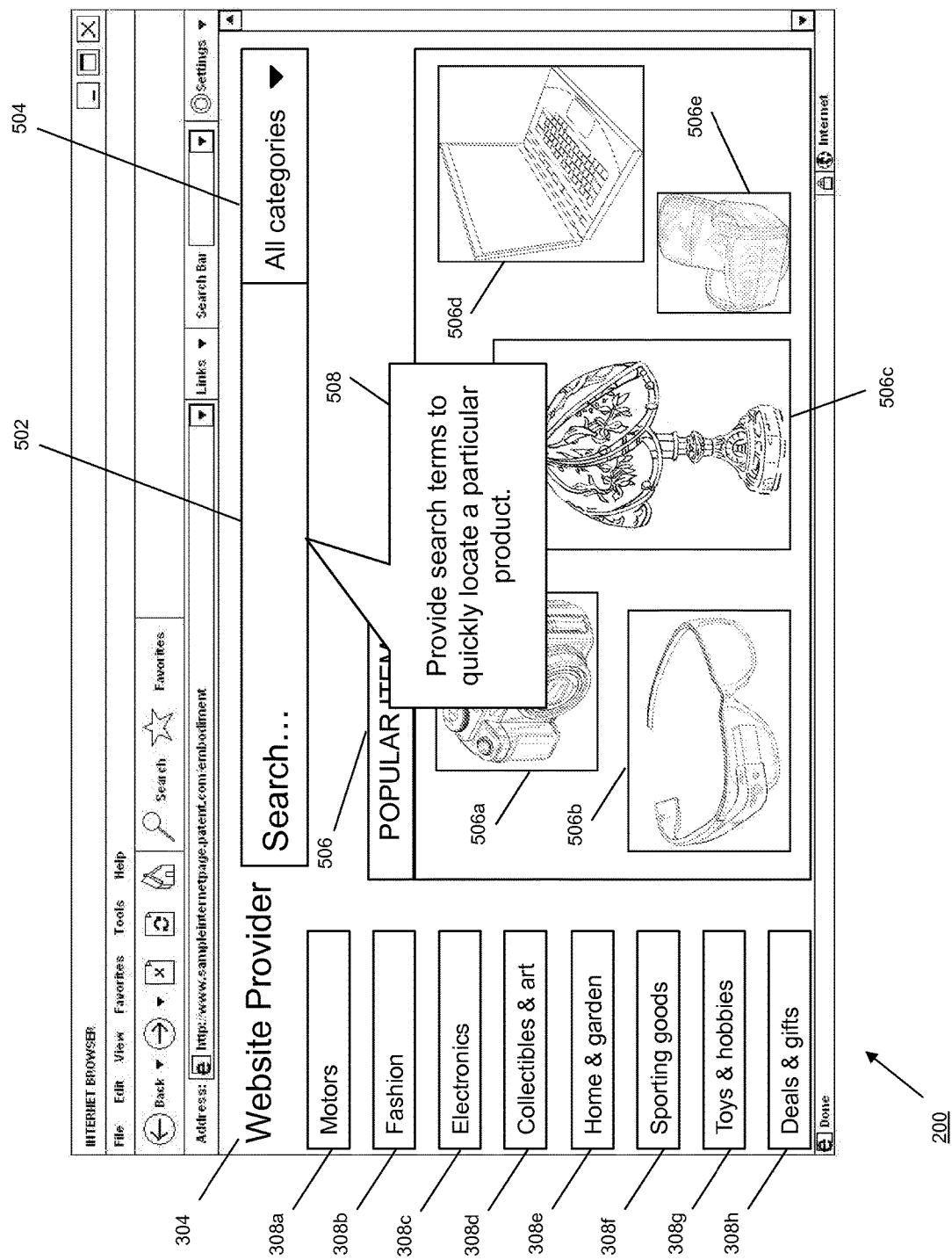
FIG. 5b is a screen shot illustrating an embodiment of the customized home page of FIG. 5a including a user instruction directed to the customization.

Referring now to FIGS. 3, 5*a*, and 5*b*, and using the specific example of a user interface use profile determined based on user activity data generated from other user devices 210 navigating through the non-customized home page 300 discussed above with reference to FIG. 3, the new user navigation detail received at block 106 may include the new user device 202 providing a website address for the website user interface in a website address input to access a home page, and a user interface use profile may be retrieved at block 108 that includes the first navigation detail that includes the provision of the non-customized home page 300 following the provision of a website address for the website user interface in a website address input, and a primary second navigation detail associated with the first navigation detail that includes the provision of one or more search terms in a search input based on other user devices 210 performing the primary second navigation detail 65% of the time after providing the first navigation detail. In response to retrieving such a user interface use profile, the system provider device 206 may customize the non-customized home page 300 to provide a customized home page 500.

In the illustrated embodiment, the customized home page 500 is similar to the non-customized home page 300, and includes a website provider identifier 304 identifying the website provider, as well as the plurality of product category links 308*a-h*. However, the customized home page 500 has been modified relative to the non-customized home page 300 by replacing the search input 306 and search input category filter 306*a* with a modified search input 502 and a modified search input category filter 504 for allowing users to search for products described by the website, as well as replacing the popular items display 310 and item images 310*a-e* with a modified popular items display 506 including a plurality of modified item images 506*a*, 506*b*, 506*c*, 506*d*, and 506*e*. As can be seen from a comparison of the non-customized home page 300 and the customized home page 500, the modified search input 502 and a modified search input category filter 504 are increased in size relative to the search input 306 and search input category filter 306*a*, while the modified popular items display 506 including a plurality of modified item images 506*a-e* have been decreased in size relative to the popular items display 310 and item images 310*a-e*. Thus, in response to a subsequent navigation detail in the user interface use profile retrieved at block 108 that indicates that the new user device is most likely to perform a product search using the search input 306 on the non-customized home page 300, the non-customized home page 300 may be modified to provide the customized home page 500 that emphasizes the search feature on the website user interface by providing a larger search input 306 and search input category filter 306*a* while deemphasizing features on the user interface that are not likely to be involved in a subsequent new user navigation detail (e.g., the popular items display 310 and item images 310*a-e*.) In some embodiments, a user instruction may be provided based on the subsequent navigation detail and/or other details associated with the customization of the user interface. For example, the user instruction 508 illustrated in FIG. 5*b* provides an instruction to the user of the new user device 202 to provide search terms in the modified search input 502, as that action is the most likely user navigation detail to be provided by the new user device 202 based on the new user navigation detail received at block 106.

Figure 6A:
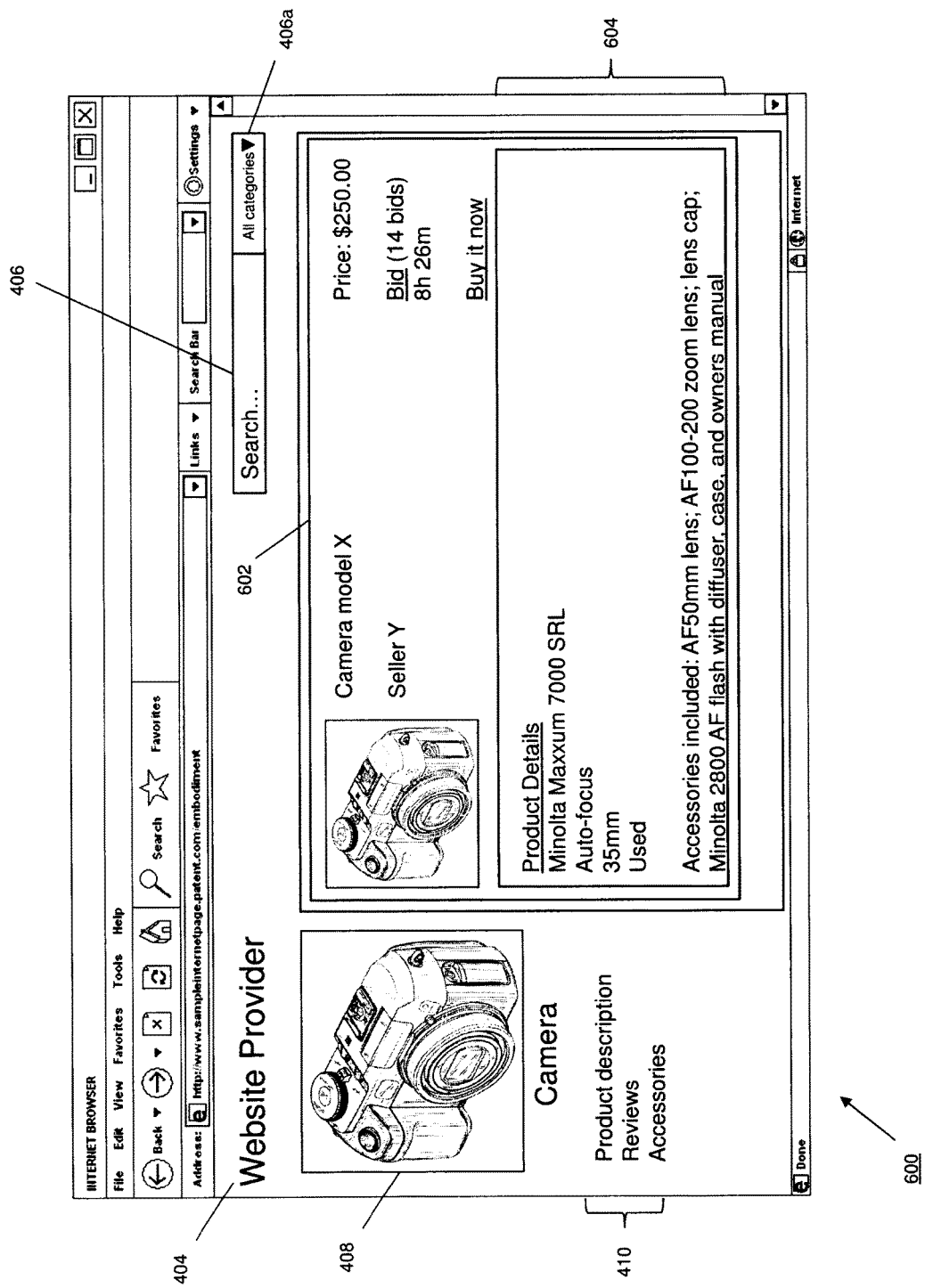
FIG. 6a is a screen shot illustrating an embodiment of the customization of the non-customized product page of FIG. 3 to provide a customized products page.
Figure 6B:
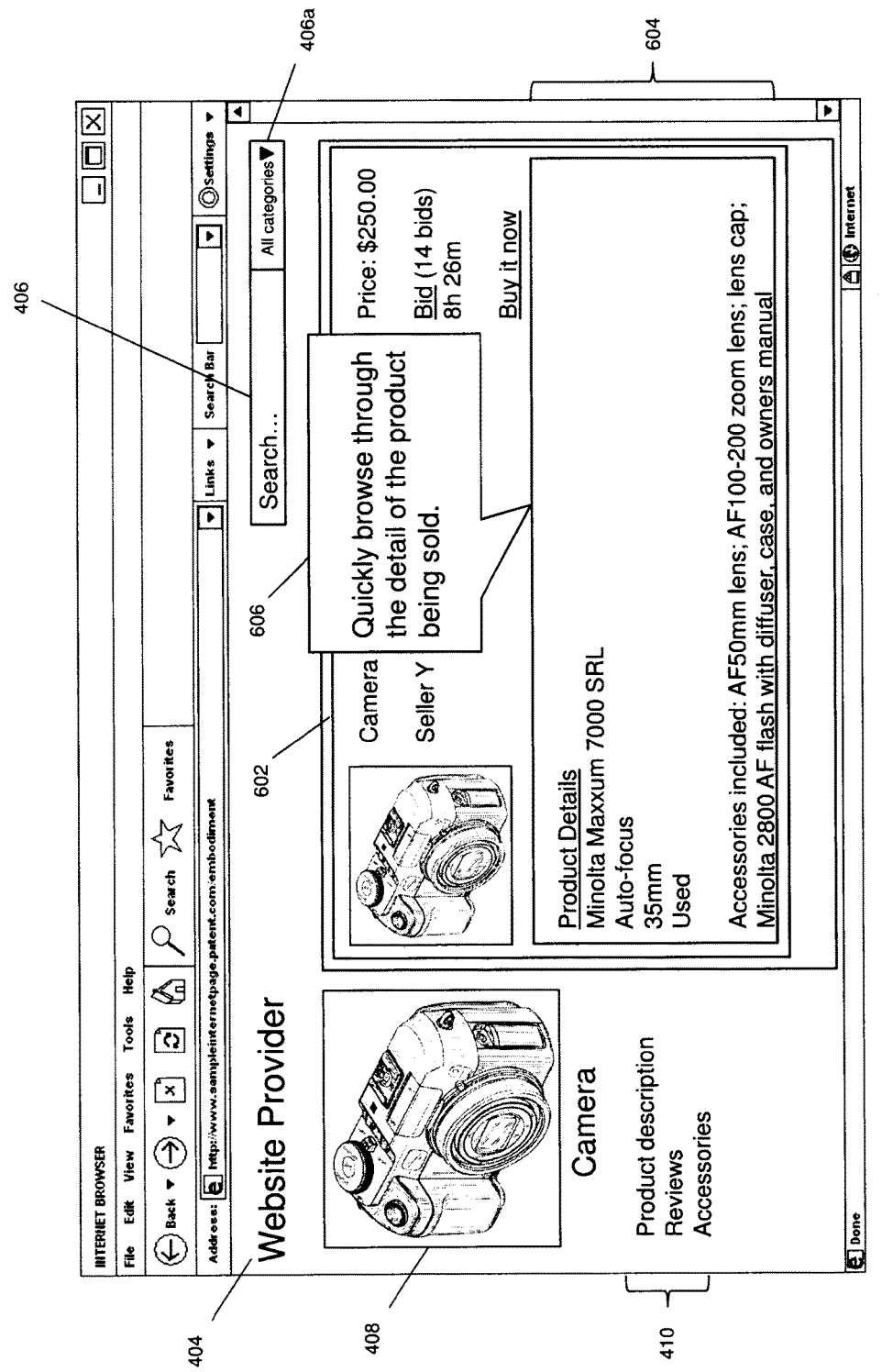
FIG. 6b is a screen shot illustrating an embodiment of the customized products page of FIG. 6a including a user instruction directed to the customization.

Referring now to FIGS. 4, 6*a*, and 6*b*, using the specific example of a user interface use profile determined based on user activity data generated from other user devices 210 navigating through the non-customized product page 400 discussed above with reference to FIG. 4, the new user navigation detail received at block 106 may include the new user device 202 providing a search query to receive search results page and selecting a web link on the search results page to access a product page, and a user interface use profile may be retrieved at block 108 that includes the first navigation detail that includes the provision of the non-customized product page 400 following the provision of a search query to receive search results page and the selecting of a web link on the search results page to access a product page. As discussed above, a primary second navigation detail associated with the first navigation detail may include the provision of an instruction from the other user devices 210 to provide details about a product in the first product section 412 based on other user devices 210 performing the primary second navigation detail 40% of the time after providing the first navigation detail. In response to retrieving such a user interface use profile, the system provider device 206 may customize the non-customized product page 400 to provide a customized product page 600.

In the illustrated embodiment, the customized product page 600 is similar to the non-customized product page 400, and includes the website provider identifier 404 identifying a website provider; the search input 406 along with a search input category filter 406a for allowing users to search for products described by the website; the product image 408 of a product type matching the search query provided by the user; and the product information 410 including a description, reviews, and accessories related to the product type matching the search query provided by the user. However, the customized product page 600 has modified relative to the non-customized product page 400 by replacing the first product section 412 with a modified first product section 602 for the first product being offered on the website that matches the search query provided by the user, as well as removing the second product section 414 for the second product being offered on the website that matches the search query provided by the user. As can be seen from a comparison of the non-customized product page 400 and the customized product page 600, the modified first product section 602 includes the image of the product for sale, the product name, the seller name, the price, the bid instruction, and the buy instruction. However, the product details link 412a has been replaced with a product details section 604. Thus, in response to a subsequent navigation detail in the user interface use profile retrieved at block 108 that indicates that the new user device is most likely to request product details for the product in the first product section 412 on the non-customized product page 400, the non-customized product page 400 may be modified to provide the customized product page 600 that automatically provides the product details for the product in the modified first product section 602. In some embodiments, a user instruction may be provided based on the subsequent navigation detail. For example, the user instruction 606 illustrated in FIG. 6b provides an instruction to the user of the new user device 202 to browse through the product details section, as that is the most likely user navigation detail to be provided by the new user device 202 based on the new user navigation detail received at block 106.

Similarly, the new user navigation detail received at block 106 may include the new user device 202 launching a weather application at a particular time (e.g., the morning), and a user interface use profile may be retrieved at block 108 that includes the first navigation detail that includes the launching of the application following the startup of the application at the particular time. As discussed above, a primary second navigation detail associated with the first navigation detail may include a request for the weather in a particular location, while a secondary second navigation detail associated with the first navigation detail may include a request for a weather map. In response to retrieving such a user interface use profile, the system provider device 206 may customize the application user interface to provide weather for a particular location, as well as a weather map, automatically following the launch of the weather application at the particular time.

One of skill in the art in possession of the present disclosure will recognize that any navigation detail provided by the new user device 202 on, for example, the customized home page 500, the customized product page 600, or the customized application user interface discussed above, may result in a subsequent customized page being provided by the system provider device 206 to the new user device 202 using the first user interface use profile retrieved at block 108, a different user interface use profile retrieved similarly as discussed above for the first user interface use profile retrieved at block 108 (e.g., but in response to the most recent navigation detail provided by the new user device 202), etc. Thus, the new user device may navigate through customized pages of the user interface based on each subsequent navigation detail received by the user device. Furthermore, any type of customization of the user interface may be enabled from the user interface use profiles stored in the database 208, including user interface layout, coloring, features, and/or a variety of other user interface characteristics known in the art.

Thus, systems and methods for providing a user interface has been described that provides for the prediction of a user workflow and the customization of the user interface for any user accessing the user interface. Such predictions and customization are based on a plurality of user activity data collected from a plurality of other user devices that have previously navigated through the user interface such that the predictions and customizations for a new user accessing and navigating through the user interface area are based on a present navigation detail provided by the new user and the most likely subsequent navigation detail to follow from that new user based on the navigation details previously received from the other user devices.

The systems and method described above may provide for other benefits with regard to user interfaces. For example, the user interface use profiles may indicate which sections of the user interface (e.g., a web pages on a website, application pages on an application, etc.) are most frequented or used, and the system provider device may then optimize and/or ensure the functionality of those sections or features to ensure their quality and ease of use such that most users using that user interface will be provided a good experience with the user interface. Furthermore, users may customize their user interface (e.g., colors, features, layout, etc.) and that user customization data may be collected along with any user activity data. When a when a user that is unknown to the system accesses the user interface via a new user navigation detail, the user interface use profile retrieved based on that new user navigation detail may include user customization data from a plurality of users that indicate that a predetermined number of users that provide a navigation detail that is the same as the new user navigation detail also include specific customization features, and thus those customization features may then be provided in the user interface to the new user.

Referring now to FIG. 7, an embodiment of a network-based system 700 for implementing one or more processes described herein is illustrated. As shown, network-based system 700 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 700 illustrated in FIG. 76 includes a plurality of user devices 702, a website provider device 704, an application provider device 705, a payment service provider device 706, an account provider device 708, and a system provider device 709 in communication over a network 710. Any of the user devices 702 may be the new user device 202 or other user devices 210 operated by the users, discussed above. The website provider device 704 may be the website provider devices discussed above and may be operated by the website providers discussed above. The application provider device 705 may be the application provider devices discussed above and may be operated by the application providers discussed above. The payment service provider device 706 may be the payment service provider devices discussed above and may be operated by a payment service provider such as, for example, PayPal Inc. of San Jose, Calif. The account provider device 708 may be the account provider devices discussed above and may be operated by the account providers discussed above such as, for example, credit card account providers, bank account providers, savings account providers, and a variety of other account providers known in the art. The system provider device 709 may be the system provider device 206 discussed above and may be operated by the system providers discussed above.

The user devices 702, a website provider device 704, an application provider device 705, a payment service provider device 706, an account provider device 708, and a system provider device 709 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 710.

The network 710 may be implemented as a single network or a combination of multiple networks. For example, in various embodiments, the network 710 may include the Internet and/or one or more intranets, landline networks, wireless networks, and/or other appropriate types of networks.

The user devices 702 may be implemented using any appropriate combination of hardware and/or software configured for wired and/or wireless communication over network 710. For example, in one embodiment, the user devices 702 may be implemented as a personal computer of a user in communication with the Internet. In other embodiments, the user device 702 may be a smart phone, personal digital assistant (PDA), laptop computer, and/or other types of computing devices.

The user devices 702 may include one or more browser applications which may be used, for example, to provide a convenient interface to permit the payer to browse information available over the network 710. For example, in one embodiment, the browser application may be implemented as a web browser configured to view information available over the Internet.

The user devices 702 may also include one or more toolbar applications which may be used, for example, to provide user-side processing for performing desired tasks in response to operations selected by the payer. In one embodiment, the toolbar application may display a user interface in connection with the browser application.

The user devices 702 may further include other applications as may be desired in particular embodiments to provide desired features to the user devices 702. In particular, the other applications may include a payment application for payments assisted by a payment service provider through the payment service provider device 706. The other applications may also include security applications for implementing user-side security features, programmatic user applications for interfacing with appropriate application programming interfaces (APIs) over the network 710, or other types of applications. Email and/or text applications may also be included, which allow users to send and receive emails and/or text messages through the network 710. The user devices 702 includes one or more user and/or device identifiers which may be implemented, for example, as operating system registry entries, cookies associated with the browser application, identifiers associated with hardware of the user devices 702, or other appropriate identifiers, such as a phone number. In one embodiment, the user identifier may be used by the payment service provider device 706 and/or account provider device 708 to associate the user with a particular account as further described herein.

The website provider device 704 and/or application provider device 705 may be maintained, for example, by a conventional or on-line merchant, conventional or digital goods seller, individual seller, and/or application developer offering various products and/or services in exchange for payment to be received conventionally or over the network 710. In this regard, the website provider device 704 and/or application provider device 705 may include a database identifying available products and/or services (e.g., collectively referred to as items) which may be made available for viewing and purchase by the payer.

The website provider device 704 and/or application provider device 705 also includes a checkout application which may be configured to facilitate the purchase by the payer of items. The checkout application may be configured to accept payment information from the user through the user devices 702, the account provider through the account provider device 708, and/or from the payment service provider through the payment service provider device 706 over the network 710.

Figure 8:
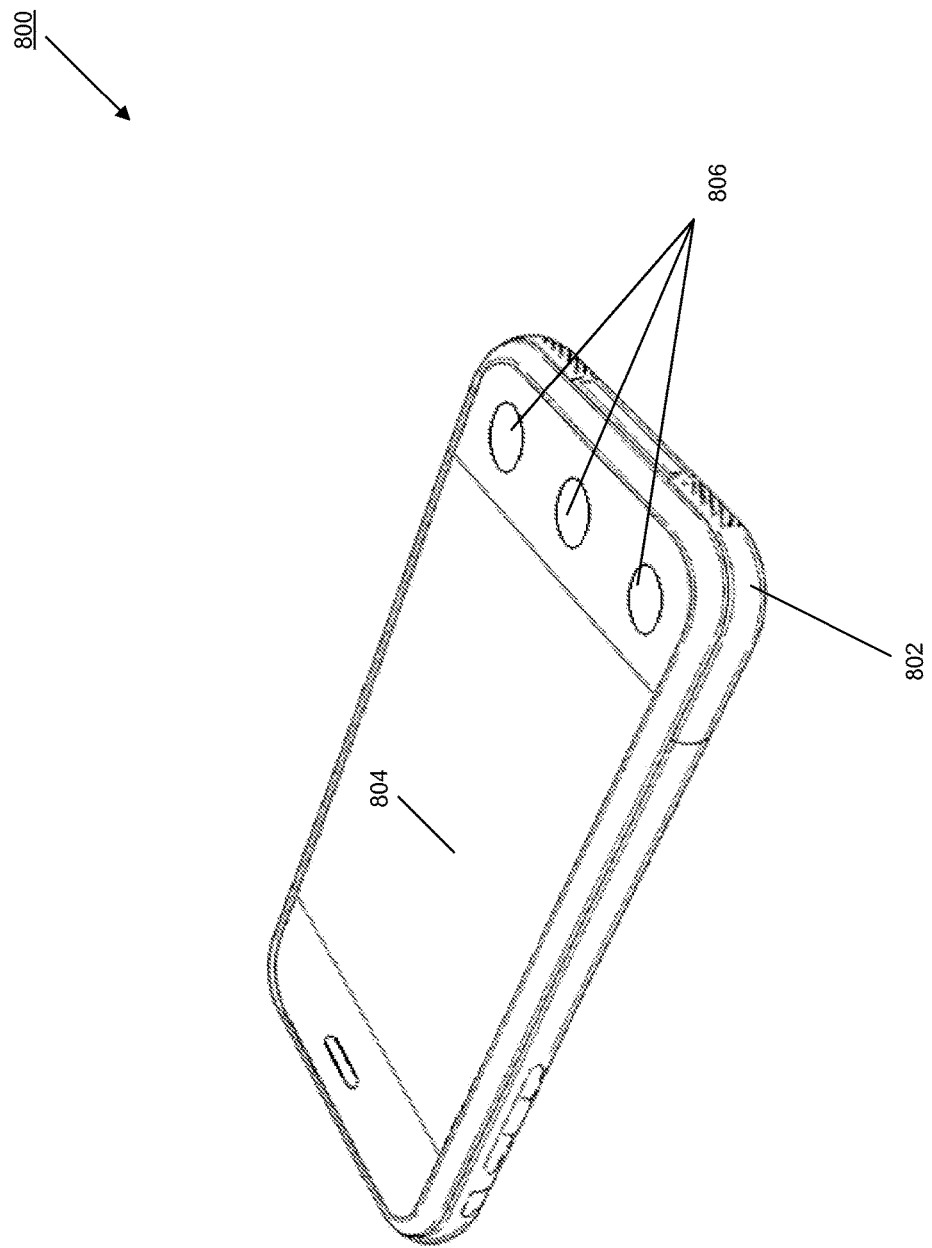
FIG. 8 is a perspective view illustrating an embodiment of a user device.

Referring now to FIG. 8, an embodiment of a user device 800 is illustrated. The user device 800 may be the user devices 202, 210, and/or 702. The user device 800 includes a chassis 802 having a display 804 and an input device including the display 804 and a plurality of input buttons 806. One of skill in the art will recognize that the user device 800 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 9:
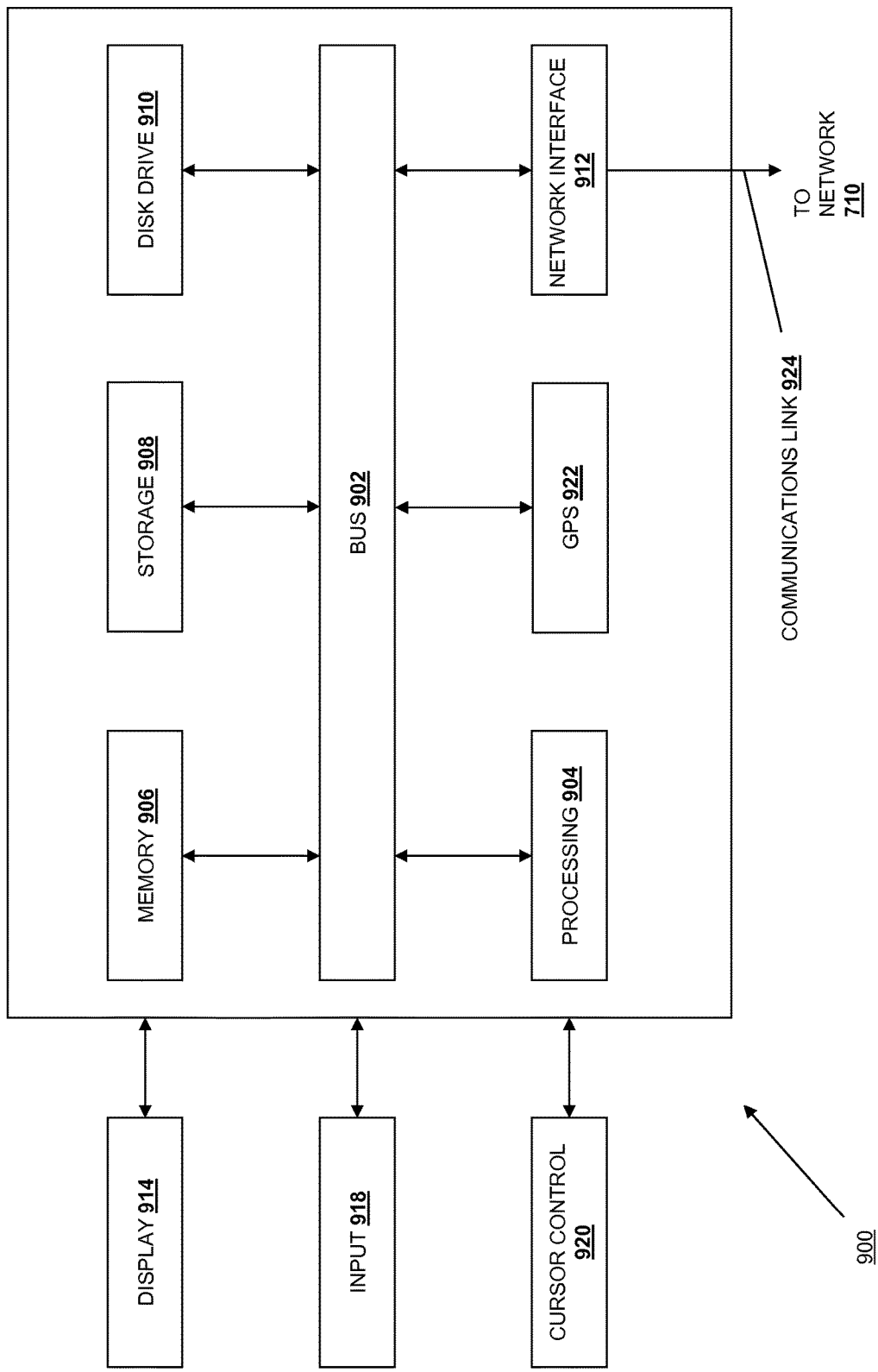
FIG. 9 is a schematic view illustrating an embodiment of a computer system.

Referring now to FIG. 9, an embodiment of a computer system 900 suitable for implementing, for example, the user devices 202, 210, 702, or 800, the website provider device 704, the application provider device 705, the payment service provider device 706, the account provider device 708, and/or the system provider device 709 is illustrated. It should be appreciated that other devices utilized by payer, payees, payment service providers, and account providers in the payment system discussed above may be implemented as the computer system 900 in a manner as follows.

In accordance with various embodiments of the present disclosure, computer system 800, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices known in the art.) In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the user devices 202, 210, 702, or 800, the website provider device 704, the application provider device 705, the payment service provider device 706, the account provider device 708, and/or the system provider device 709. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 924 to the network 910 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Figure 10:
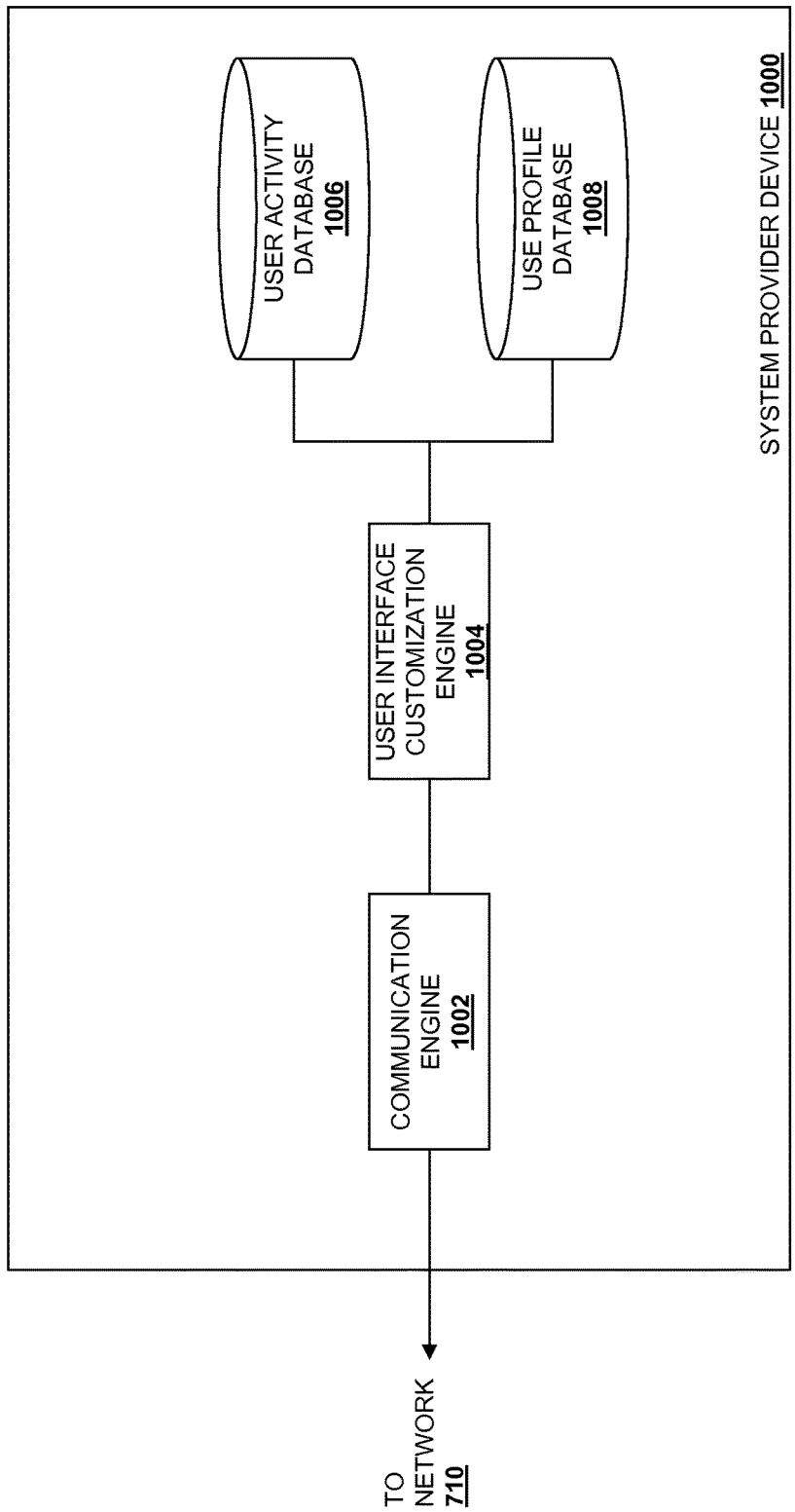
FIG. 10 is a schematic view illustrating an embodiment of a system provider device.

Referring now to FIG. 10, an embodiment of a system provider device 1000 is illustrated. In an embodiment, the device 1000 may be any of the system provider devices, discussed above. The device 1000 includes a communication engine 1002 that is coupled to the network 710 and to a user interface customization engine 1004 that is coupled to a user activity database 1006 and a use profile database 1008. The communication engine 1002 may be software or instructions stored on a computer-readable medium that allows the device 1000 to send and receive information over the network 710. The user interface customization engine 1004 may be software or instructions stored on a computer-readable medium that is operable to collect user activity data and store it in the user activity database 1006, determine user interface use profile and store them in the use profile database 1008, receive new user navigation details, retrieve user interface use profiles from the use profile database 1008, create customized user interfaces, provide customized user interfaces over the network 710, and provide any of the other functionality that is discussed above. While the databases 1006 and 1008 has been illustrated as located in the device 1000, one of skill in the art will recognize that it may be connected to the user interface customization engine 1004 through the network 710 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and user interface providers associated with the selling of products; however, a payer or consumer can pay, or otherwise interact with any type of recipient, including charities and individuals. The payment does not have to involve a purchase, but may be a loan, a charitable contribution, a gift, etc. Thus, user interface providers discussed herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing user activity data and a plurality of non-customized user interfaces; and
one or more hardware processors coupled to the non-transitory memory and configured to execute instructions to cause the system to perform operations comprising:
collecting the user activity data from a plurality of user devices over a network and storing the user activity data in the non-transitory memory, wherein the user activity data includes at least one set of navigation details provided from each of the plurality of user devices in navigating through a subset of the plurality of non-customized user interfaces that are provided within a website;
determining a plurality of user interface use profiles using the user activity data and storing the plurality of user interface user profiles in the non-transitory memory, wherein each of the plurality of user interface use profiles includes information on the likelihood of at least one subsequent navigation detail based on at least one present navigation detail provided in one of the plurality of non-customized user interfaces;
receiving a first new user navigation detail over the network from a first new user device that has provided an instruction to initially access the website using a non-customized home page user interface of the plurality of non-customized user interfaces;
retrieving a first user interface use profile from the non-transitory memory based on a first present navigation detail in the first user interface use profile that corresponds to the first new user navigation detail that provides the instruction to initially access the website using the non-customized home page user interface of the plurality of non-customized user interfaces;
creating a customized home page user interface for the first new user device using the non-customized home page user interface of the plurality of non-customized user interfaces and at least one first subsequent navigation detail associated with the first present navigation detail in the first user interface use profile, wherein a search input user interface component of a plurality of user interface components on the non-customized home page user interface is enlarged to provide the customized home page user interface while a subset of the plurality of user interface components on the non-customized home page user interface are the same in the customized home page user interface; and
providing the customized home page user interface over the network to the first new user device as a first initial access web page of the website.

2. The system of claim 1, wherein the operations further comprise:
receiving a second new user navigation detail over the network from a second new user device that has provided an instruction to initially access the website using a non-customized product page user interface of the plurality of non-customized user interfaces;
retrieving a second user interface use profile from the non-transitory memory based on a second present navigation detail in the second user interface use profile that corresponds to the second new user navigation detail that provides the instruction to initially access the website using the non-customized product page user interface of the plurality of non-customized user interfaces;
creating a customized product page user interface for the second new user device using the non-customized product page user interface of the plurality of non-customized user interfaces and at least one second subsequent navigation detail associated with the second present navigation detail in the second user interface use profile, wherein a product details user interface component of a plurality of user interface components on the non-customized product page user interface is modified to provide the customized product page user interface while a subset of the plurality of user interface components on the non-customized product pane user interface are the same in the customized product pane user interface; and
providing the customized product pane user interface over the network to the second new user device as a second initial access web pane of the website.

3. The system of claim 2, wherein the product details user interface component of the plurality of user interface components on the non-customized product page user interface include a link to product information, and wherein the link to product information is modified to display the product information to provide the customized product page user interface.

4. The system of claim 1, wherein the subset of the plurality of user interface components on the non-customized product page user interface include at least one user interface feature that is reduced in size to provide the customized product page user interface.

5. The system of claim 1, wherein the creating the customized home page user interface for the first new user device includes providing a user instruction that is displayable on the customized home page user interface and that is not provided in the non-customized home page user interface.

6. The system of claim 1, wherein the user activity data includes timing data that is associated with each set of navigation details and that was provided from each of the plurality of user devices in navigating through the subset of the plurality of non-customized user interfaces, and wherein the retrieving the first user interface use profile is also based on first new user timing data associated with the first new user navigation detail.

7. A method for providing user interfaces, comprising:
collecting user activity data from a plurality of user devices over a network and storing the user activity data in a database, wherein the user activity data includes at least one set of navigation details provided from each of the plurality of user devices in navigating through a plurality of non-customized user interfaces that are provided within a website;

determining a plurality of user interface use profiles using the user activity data and storing the plurality of user interface user profiles in the database, wherein each of the plurality of user interface use profiles includes information on the likelihood of at least one subsequent navigation detail based on at least one present navigation detail provided in one of the plurality of non-customized user interfaces;

receiving a first new user navigation detail over the network from a first new user device that has provided an instruction to initially access the website using a non-customized home page user interface of the plurality of non-customized user interfaces;

retrieving a first user interface use profile from the database based on a first present navigation detail in the first user interface use profile that corresponds to the first new user navigation detail that provides the instruction to initially access the website using the non-customized home page user interface of the plurality of non-customized user interfaces;

creating a customized home page user interface for the first new user device using the non-customized home page user interface of the plurality of non-customized user interfaces and at least one first subsequent navigation detail associated with the first present navigation detail in the first user interface use profile, wherein a search input user interface component of a plurality of user interface components on the non-customized home page user interface is enlarged to provide the customized home page user interface while a subset of the plurality of user interface components on the non-customized home page user interface are the same in the customized home page user interface; and providing the customized home page user interface over the network to the first new user device as a first initial access web page of the website.

8. The method of claim 7, further comprising:

receiving a second new user navigation detail over the network from a second new user device that has provided an instruction to initially access the website using a non-customized product page user interface of the plurality of non-customized user interfaces;

retrieving a second user interface use profile from the non-transitory memory based on a second present navigation detail in the second user interface use profile that corresponds to the second new user navigation detail that provides the instruction to initially access the website using the non-customized product page user interface of the plurality of non-customized user interfaces;

creating a customized product page user interface for the second new user device using the non-customized product page user interface of the plurality of non-customized user interfaces and at least one second subsequent navigation detail associated with the second present navigation detail in the second user interface use profile, wherein a product details user interface component of a plurality of user interface components on the non-customized product page user interface is modified to provide the customized product page user interface while a subset of the plurality of user interface components on the non-customized product page user interface are the same in the customized product page user interface; and providing the customized product page user interface over the network to the second new user device as a second initial access web page of the website.

9. The method of claim 8, wherein the product details user interface component of the plurality of user interface components on the non-customized product page user interface include a link to product information, and wherein the link to product information is modified to display the product information to provide the customized product page user interface.

10. The method of claim 7, wherein the subset of the plurality of user interface components on the non-customized product page user interface include at least one user interface feature that is reduced in size to provide the customized product page user interface.

11. The method of claim 7, wherein the creating the customized home page user interface for the first new user device includes providing a user instruction that is displayable on the customized home page user interface and that is not provided in the non-customized home page user interface.

12. The method of claim 7, wherein the user activity data includes timing data that is associated with each set of navigation details and that was provided from each of the plurality of user devices in navigating through the plurality of non-customized user interfaces, and wherein the retrieving the first user interface use profile is also based on first new user timing data associated with the first new user navigation detail.

13. The method of claim 7, wherein the creating the customized home page user interface for the first new user device using the non-customized home page user interface and the at least one first subsequent navigation detail includes determining that the at least one first subsequent navigation detail has more than a predetermined likelihood based on the at least one present navigation detail that corresponds to the first new user navigation detail.

14. A non-transitory machine-readable medium having stored thereon a plurality of machine-readable instructions executable to cause a machine to perform operations comprising:

collecting user activity data from a plurality of user devices over a network and storing the user activity data in a database, wherein the user activity data includes at least one set of navigation details provided from each of the plurality of user devices in navigating through a plurality of non-customized user interfaces that are provided within a website;

determining a plurality of user interface use profiles using the user activity data and storing the plurality of user interface user profiles in the database, wherein each of the plurality of user interface use profiles includes information on the likelihood of at least one subsequent navigation detail based on at least one present navigation detail provided in one of the plurality of non-customized user interfaces;

receiving a first new user navigation detail over the network from a first new user device that has provided an instruction to initially access the website using a non-customized home page user interface of the plurality of non-customized user interfaces;

retrieving a first user interface use profile from the database based on a first present navigation detail in the first user interface use profile that corresponds to the first new user navigation detail that provides the instruction to initially access the website using the non-customized home page user interface of the plurality of non-customized user interfaces;

creating a customized home page user interface for the first new user device using the non-customized home page user interface of the plurality of non-customized user interfaces and at least one first subsequent navigation detail associated with the first present navigation detail in the first user interface use profile, wherein a search input user interface component of a plurality of user interface components on the non-customized home page user interface is enlarged to provide the customized home page user interface while a subset of the plurality of user interface components on the non-customized home page user interface are the same in the customized home page user interface; and providing the customized home page user interface over the network to the first new user device as a first initial access web page of the website.

15. The non-transitory machine-readable medium of claim 14, wherein the operations further comprise:

receiving a second new user navigation detail over the network from a second new user device that has provided an instruction to initially access the website using a non-customized product page user interface of the plurality of non-customized user interfaces;

retrieving a second user interface use profile from the non-transitory memory based on a second present navigation detail in the second user interface use profile that corresponds to the second new user navigation detail that provides the instruction to initially access the website using the non-customized product page user interface of the plurality of non-customized user interfaces;

creating a customized product page user interface for the second new user device using the non-customized product page user interface of the plurality of non-customized user interfaces and at least one second subsequent navigation detail associated with the second present navigation detail in the second user interface use profile, wherein a product details user interface component of a plurality of user interface components on the non-customized product page user interface is modified to provide the customized product page user interface while a subset of the plurality of user interface components on the non-customized product pane user interface are the same in the customized product pane user interface; and providing the customized product pane user interface over the network to the second new user device as a second initial access web pane of the website.

16. The non-transitory machine-readable medium of claim 15, wherein the product details user interface component of the plurality of user interface components on the non-customized product page user interface include a link to product information, and wherein the link to product information is modified to display the product information to provide the customized product page user interface.

17. The non-transitory machine-readable medium of claim 14, wherein the subset of the plurality of user interface components on the non-customized product page user interface include at least one user interface feature that is reduced in size to provide the customized product page user interface.

18. The non-transitory machine-readable medium of claim 14, wherein the creating the customized home page user interface for the first new user device includes providing a user instruction that is displayable on the customized home page user interface and that is not provided in the non-customized home page user interface.

19. The non-transitory machine-readable medium of claim 14, wherein the user activity data includes timing data that is associated with each set of navigation details and that was provided from each of the plurality of user devices in navigating through the plurality of non-customized user interfaces, and wherein the retrieving the first user interface use profile is also based on first new user timing data associated with the first new user navigation detail.

20. The non-transitory machine-readable medium of claim 14, wherein the creating the customized home page user interface for the first new user device using the non-customized home page user interface and the at least one first subsequent navigation detail includes determining that the at least one first subsequent navigation detail has more than a predetermined likelihood based on the at least one present navigation detail that corresponds to the first new user navigation detail.

* * * * *

UNITED STATES PATENT AND TRADEMARK OFFICE
CERTIFICATE OF CORRECTION

PATENT NO.        : 9,712,627 B2
APPLICATION NO.   : 13/955610
DATED             : July 18, 2017
INVENTOR(S)       : Sergii Sergunin It is certified that error appears in the above-identified patent and that said Letters Patent is hereby corrected as shown below:

On the Title Page

In item (57), in Column 2, in "Abstract", Line 14, after "associated" insert -- with --.

In the Claims

In Column 20, Line 33, in Claim 2, delete "pane" and insert -- page --, therefor.

In Column 20, Line 34, in Claim 2, delete "pane" and insert -- page --, therefor.

In Column 20, Line 36, in Claim 2, delete "pane" and insert -- page --, therefor.

In Column 20, Line 38, in Claim 2, delete "pane" and insert -- page --, therefor.

In Column 24, Line 2, in Claim 15, delete "pane" and insert -- page --, therefor.

In Column 24, Line 3, in Claim 15, delete "pane" and insert -- page --, therefor.

In Column 24, Line 5, in Claim 15, delete "pane" and insert -- page --, therefor.

In Column 24, Line 7, in Claim 15, delete "pane" and insert -- page --, therefor.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*